Nov. 24, 1931.  S. ISRAEL  1,832,865
X-RAY CENTERING DEVICE
Filed April 22, 1929
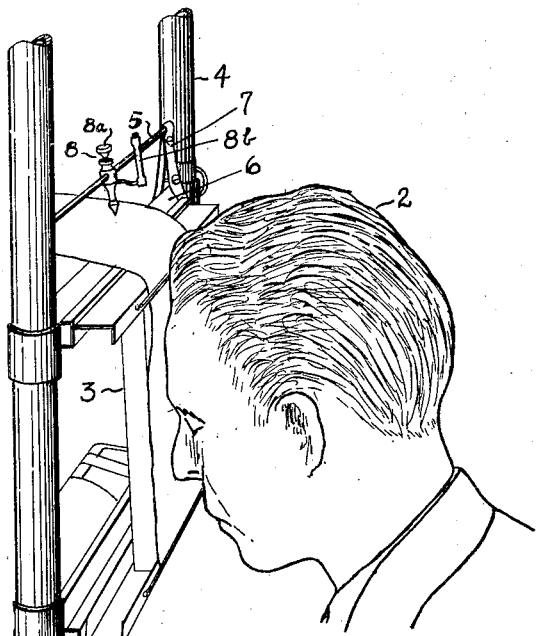
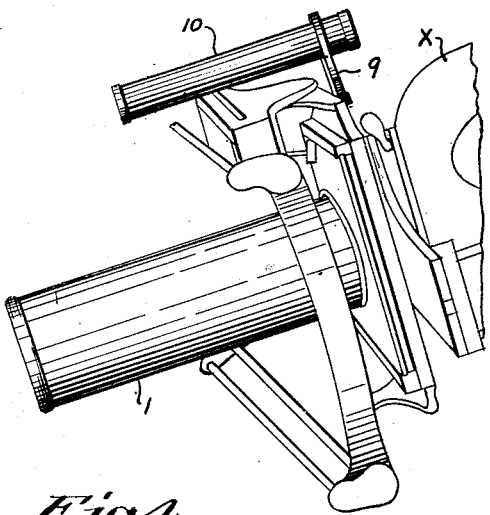
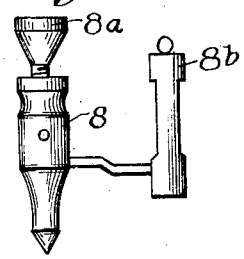
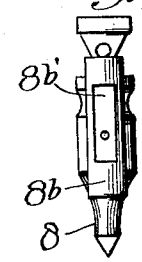
Fig. 1.  Fig. 4.  Fig. 5.
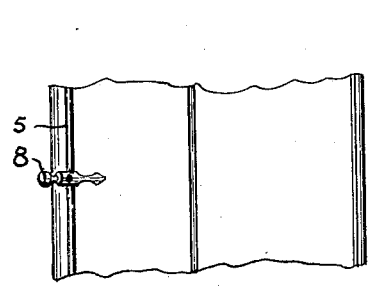
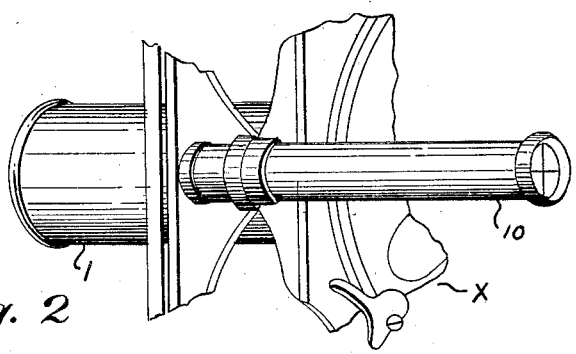
Fig. 2.
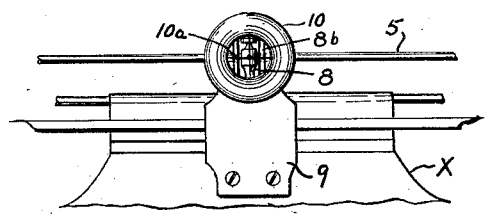
Fig. 3.
INVENTOR.
BY Sidney Israel
J. Vincent Martin
ATTORNEY.

Patented Nov. 24, 1931

1,832,865

UNITED STATES PATENT OFFICE

SIDNEY ISRAEL, OF HOUSTON, TEXAS

X-RAY CENTERING DEVICE

Application filed April 22, 1929. Serial No. 356,940.

This invention relates to X-ray apparatus and more particularly to X-ray centering devices.

It will be found particularly useful in the taking of radiographs. In that work, unless the X-rays are accurately projected upon the photographic plate, the desired shadows may not appear; and the devices now in use, while capable of roughly centering the X-rays on the plate, are not capable of accurately centering them.

This invention has for its principal and general object the provision of nicely, quickly and easily adjustable centering means to insure the accurate projection of X-rays upon a photographic plate.

The preferred embodiment of the invention is illustrated by the accompanying drawings, wherein Fig. 1 is a fragmentary side elevation in perspective illustrating the centering means and associated parts; Fig. 2, a top plan view in perspective of the same; Fig. 3, a view through the rear sight toward the placer, the intermediate sight being shown on an enlarged scale for the purposes of illustration; and Figs. 4 and 5 are detail side and end views of the placer sight.

The X-ray machine with which my invention is illustrated is indicated at X. This machine is mounted upon horizontally and vertically adjustable supports of any conventional type, not shown, and it may be provided with an X-ray confining tube 1 through which X-rays are projected by the X-ray tube. The rays penetrate the object 2 (illustrated as a human head) and shadows are cast upon the photographic plate 3. The plate 3 may be adjustably supported by a frame 4, such as that covered by my Letters Patent of the United States, No. 1,671,902.

The use of the apparatus just referred to has been characterized by uncertainty and imperfect radiographs are produced because it is, as a practical matter, impossible to place the ray-confining tube 1, (or its equivalent) in the proper position with respect to the plate 3 to insure the centering of the X-rays on the plate 3.

My additions to the parts just mentioned preferably include a rod 5 mounted on and parallel to the horizontal member 6 of the plate support 4 by means of the clamps 7; and upon this rod is a suitably dotted placer 8 which is horizontally slidable and adapted to be held in place by the set screw 8a.

A sight 8b, vertically slotted as indicated at 8b', is carried by and supported directly in front of the placer 8.

By means of a bracket 9 or the like I slidably mount a sight 10 on the X-ray machine X. This sight comprises a cylindrical body having cross hairs 10a in each of its ends to define the line of sight with accuracy. It is so mounted that its axis is parallel with the axis of the ray confining tube 1 (that is, parallel with the axis of the path of the X-rays).

Now in the use of the device, the placer 8 is moved into a position where it is immediately above the center of the plate 3. The distance between the dot on the placer and the center of the plate is then equal to the distance between the axis of the sight 10 and the axis of the X-ray confining tube 1. And so when the operator looks through the sight 10 and upon the dot on the placer, and moves the X-ray machine until the cross-hairs of the sight 10 and the dot on the placer appear coincident with each other, the path of the X-rays is centered on the plate 3.

It is desirable that the rays be projected at a horizontal right angle to the plate 3, and to enable this to be accomplished, I provide the sight 8b having the slot 8b' through which the dot on the placer may be seen. As the sight 8b is supported directly in front of the placer 8, when the dot is visible through the slot 8b' to an observer looking through the sight 10, and the cross-hairs and dot appear coincident, the X-rays are centered on the plate at a horizontal right angle thereto.

In order that such visibility will not be lost when the X-ray machine is elevated or lowered, the slot 8b' is elongated vertically as shown.

It will be apparent that the combination with the conventional parts of an X-ray machine, of the device just described enable a user to quickly, easily and with great accuracy center the X-rays on a photographic plate.

Various embodiments of this invention will occur to those skilled in the art, and it is to be understood that the following claims are not limited to the particular embodiment shown nor to the specific use thereof illustrated.

I claim:

1. An X-ray apparatus having a photographic plate and a holder therefor, a device to project X-rays in a path toward said plate, a placer mounted on said plate holder, and a hollow cylindrical sight mounted on said projecting device, the distance between the axis of said sight and the axis of said projecting device being equal to the distance between said placer and the center of said plate.

2. An X-ray apparatus having a photographic plate and a holder therefor, a device to project X-rays in a path toward said plate, a placer mounted on said plate holder, a sight supported directly in front of said placer, and a sight mounted on said projecting device, the distance between the axis of said latter sight and the axis of said projecting device being substantially equal to the distance between said placer and the center of said plate.

3. An X-ray apparatus having a photographic plate and a holder therefor, a device to project X-rays in a path toward said plate, a placer mounted on said plate holder, a sight supported directly in front of said placer and having a vertical slot, and a sight mounted on said projecting device, the distance between the axis of said latter sight and the axis of said projecting device being substantially equal to the distance between said placer and the center of said plate.

4. An X-ray apparatus having a photographic plate and a holder therefor, a device to project X-rays in a path toward said plate, a placer mounted on said plate holder, a sight supported directly in front of said placer and having a vertical slot, and a sight mounted on said projecting device, said latter sight having a pair of cross hairs therein, the distance between the axis of said latter sight and the axis of said projecting device being substantially equal to the distance between said placer and the center of said plate.

5. An X-ray apparatus having a photographic plate and a holder therefor, a device to project X-rays in a path toward said plate, a placer mounted on said plate holder, and a sight mounted on said projecting device, the distance between the axis of said sight and the axis of said projecting device being substantially equal to the distance between said placer and plate.

6. The combination with an X-ray device adapted to project X-rays in a path, of a sight comprising a hollow cylindrical body mounted on said device, the axis of said body and the axis of said device being parallel.

7. In X-ray apparatus, a support, a photographic plate and a placer carried by said support, said plate and placer being adjustable with respect to each other, and a sight carried by said placer and having a vertically elongated slot directly in front of said placer.

8. For X-ray apparatus, a placer having a longitudinal bore, a transverse bore and a longitudinal set screw mounted for movement in said longitudinal bore and movable into said transverse bore, and a sight mounted on said placer and having a body spaced from and directly in front of said placer, said body having a vertically elongated slot through which a portion of said placer is visible.

In testimony whereof, I hereunto affix my signature.

SIDNEY ISRAEL.